No. 823,754. PATENTED JUNE 19, 1906.
W. BARKLA.
SAW SWAGE AND SHAPER.
APPLICATION FILED DEC. 17, 1904.
4 SHEETS—SHEET 1.
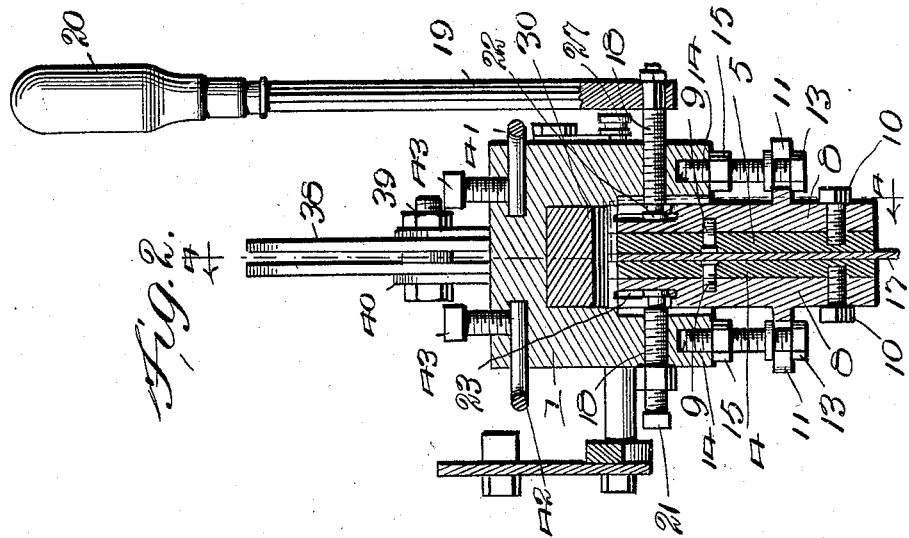
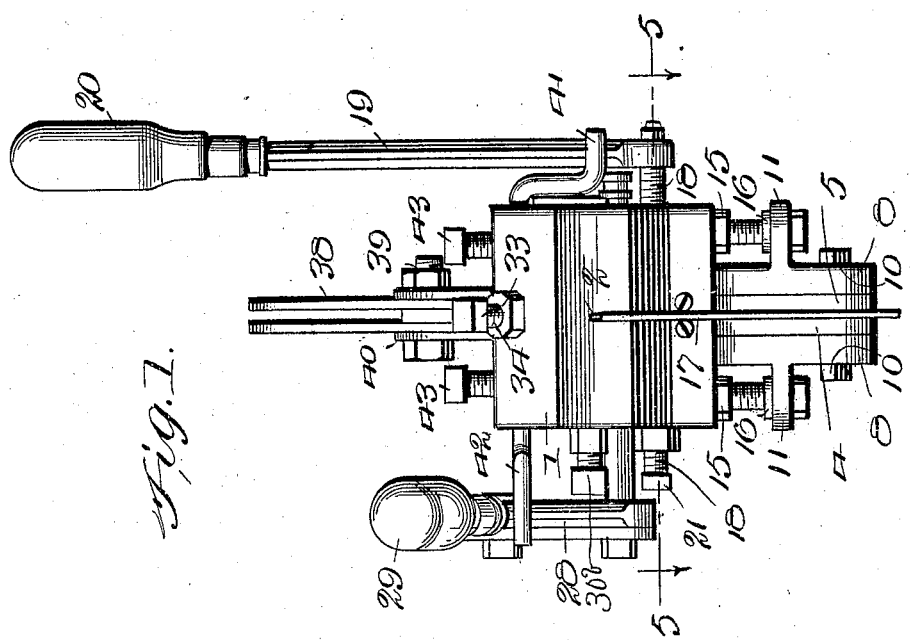
Inventor
William Barkla
Witnesses
Attorneys

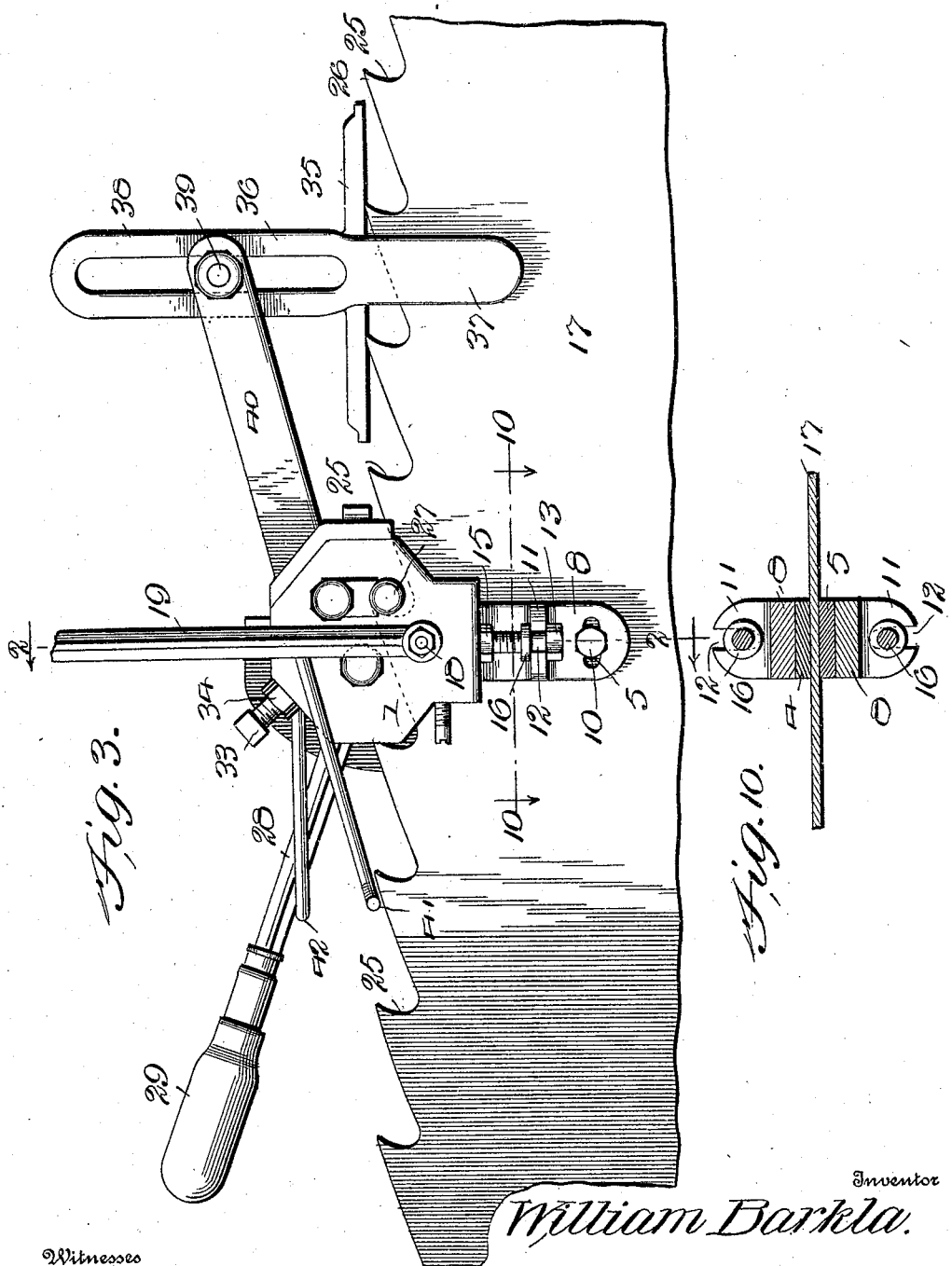

No. 823,754. PATENTED JUNE 19, 1906.
W. BARKLA.
SAW SWAGE AND SHAPER.
APPLICATION FILED DEC. 17, 1904.
4 SHEETS—SHEET 3.
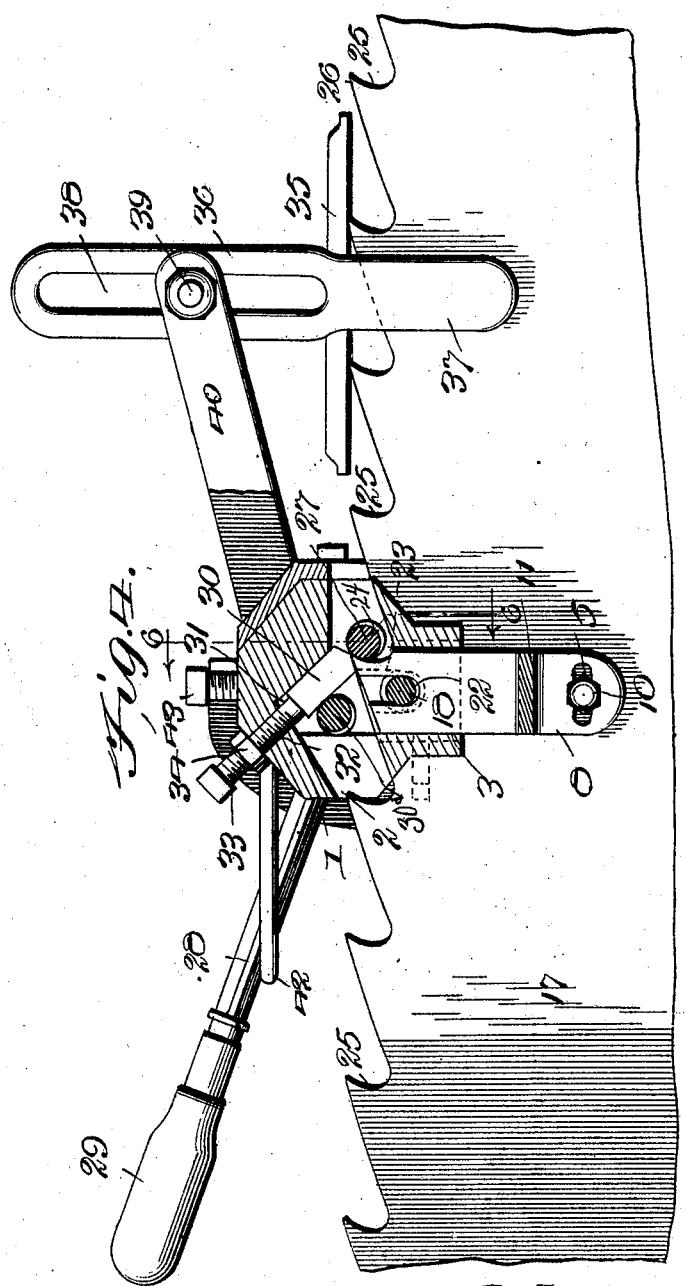
Witnesses
Inventor
William Barkla
By
Attorneys

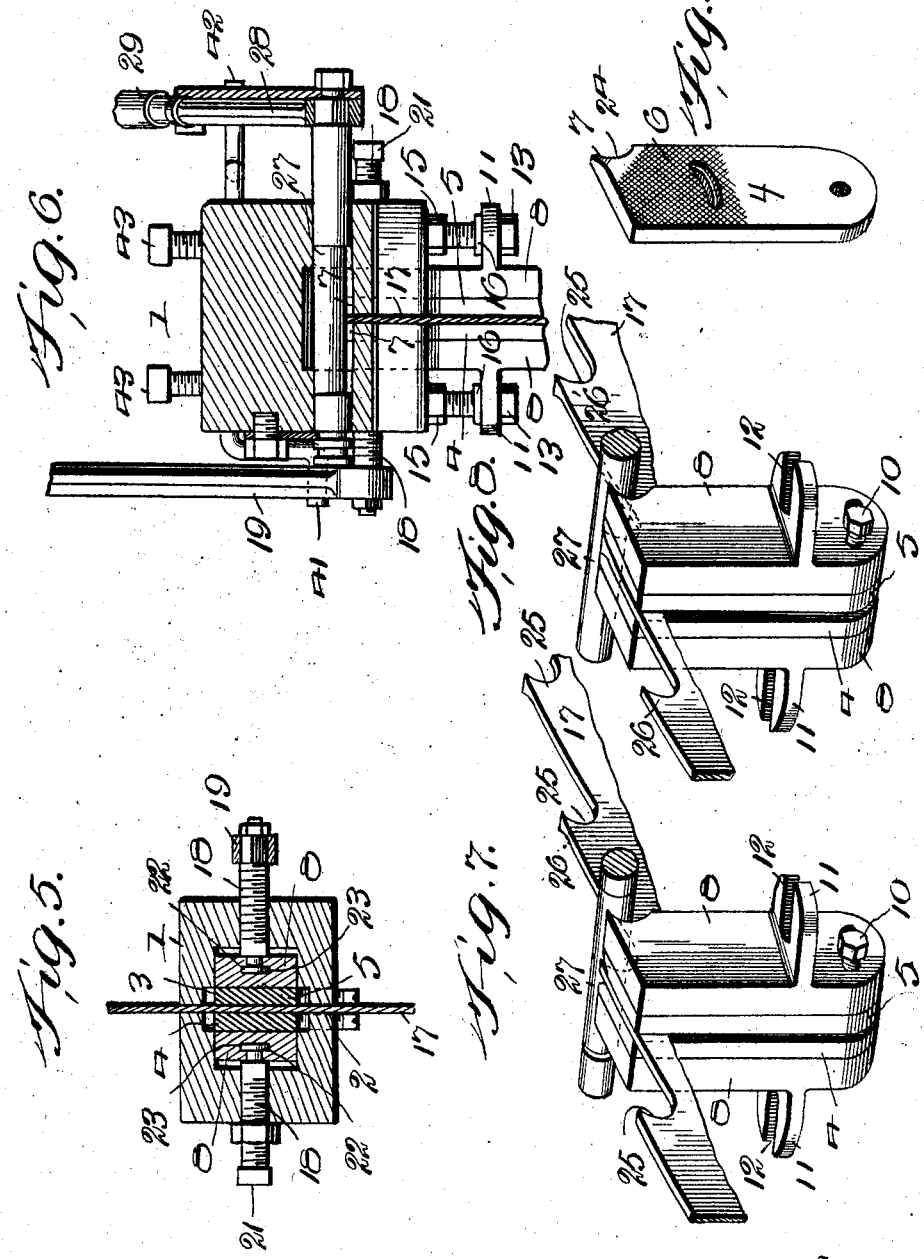

UNITED STATES PATENT OFFICE.

WILLIAM BARKLA, OF SPOKANE, WASHINGTON.

SAW SWAGE AND SHAPER.

No. 823,754.        Specification of Letters Patent.        Patented June 19, 1906.

Application filed December 17, 1904. Serial No. 237,267.

*To all whom it may concern:*

Be it known that I, WILLIAM BARKLA, a citizen of the United States, residing at Spokane, in the county of Spokane and State of Washington, have invented certain new and useful Improvements in Saw Swages and Shapers; and I do hereby declare the following to be a full, clear, and exact description of the invention, such as will enable others skilled in the art to which it appertains to make and use the same.

My invention relates to saw swaging and sharpening appliances; and it consists of certain novel features of combination and construction of parts, the preferred form whereof will be hereinafter clearly set forth, and pointed out in the claims.

The prime object of my invention, among others, is to provide a simple, though reliably-efficient appliance of the character specified, whereby the point of a tooth of a saw may be expeditiously shaped or fashioned and set in such a way as to produce the best possible results when the saw is used.

A further object of my invention is to provide means for shaping or upsetting the end of a saw-tooth whereby a lateral extension on one side of the tooth will be provided, thus making it possible to direct each alternate tooth to the left and the remaining teeth to the right so that the desired "set" will be imparted to the saw.

Other objects and advantages will be hereinafter made clearly apparent, reference being had to the accompanying drawings, which are made a part of this application, and in which—

Figure 1 shows an end view of my invention complete ready for use. Fig. 2 is a sectional view as taken on line 2 2 of Fig. 3. Fig. 3 is a side elevation of my invention complete. Fig. 4 is a sectional view taken on line 4 4 of Fig. 2. Fig. 5 is a sectional view as taken on line 5 5 of Fig. 1. Fig. 6 is a sectional view on line 6 6 of Fig. 4. Fig. 7 is a detail in perspective showing the tooth-clamping members located on either side of the saw-tooth and also showing the shaper for the concave side of the tooth. Fig. 8 is a similar view to that presented in Fig. 7, showing one side of the tooth acted upon. Fig. 9 is a perspective view showing the tooth-engaging member which coöperates with one side of the tooth. Fig. 10 is a sectional view taken on line 10 10 of Fig. 3.

For convenience of description the various parts of my invention and coöperating accessories will be designated by numerals, the same numeral applying to a similar part throughout the several views, and, referring to the numerals on the drawings, 1 indicates the body portion of my invention or framework thereof, which is provided upon its under side, as will be observed by reference to Fig. 1, with a longitudinal slit or opening 2 of proper size to receive the edge of the saw to be acted upon by other coöperating parts carried by the body portion, as will be hereinafter clearly set forth. As will be observed by reference to Fig. 2, the body portion 1 is also provided upon its under side with an opening or recess designated by the numeral 3 of proper size to receive the teeth-engaging members 4 and 5, one of which is shown in detail in Fig. 9 and consists of a suitable piece of sheet steel, preferably roughened or scored upon its inner side, as designated by the numeral 6, whereby it will more reliably frictionally engage a contiguous part of the saw. The tooth-engaging members 4 and 5 are provided with beveled corners, as designated by the numeral 7, said beveled corners being coincident with the lateral spread or reach which it is desired to impart to the sides of the saw-tooth, thus giving it the requisite set or extension which will insure that the saw will pass freely through the log without undue friction or with such a sufficiency of clearness as will insure the best results. It is obvious, therefore, that the extent of the bevel given to the corner of the member 5 may be varied, as desired. The members 4 and 5 are designed to be properly clamped within the opening 3, provided in the body portion or framework 1, and this I am enabled to accomplish, as will be seen by reference to Fig. 2, by means of the clamping members 8, said parts 4 and 5 being secured to said members in any preferred way, as by the set-screws 9 or equivalent means, the heads of said set-screws being left flush with the inner face or side of said members 4 and 5.

It will be observed by reference to Fig. 2 that the lower ends of the members 4 and 5 are secured to the clamping members 8 by the set-screws 10, and in order that the said members 4 and 5 and the controlling members 8 therefor may be adjustably secured and held in an upright or vertical position I have provided upon the members 8 the lateral extensions or ears 11, preferably slotted, as shown in Fig. 7. The slots in the ears 11 are designated by the numeral 12, and locking-bolts 13 are designed to rest in the slots 12, while their threaded ends are entered in the threaded seats 14, formed in the lower side of the framework or body 1. I have also provided a jam-nut 15 to hold the locking-bolts 13 in an adjusted position and have also formed upon said bolts a collar or auxiliary jam-nut 16, so that by turning said bolts 13 said members 8 may be raised or lowered, as desired.

In order that the upper ends of the members 4 and 5 may be forced tightly against the sides of the tooth of the saw-blade, which latter is designated by the numeral 17, I have provided the locking-bolts 18, seated in suitable apertures in the body portion 1. One of the controlling-bolts 18 is provided upon its outer end with the controlling-lever 19, having a suitable handle 20, while the other is provided with an angular head 21 for the control of a wrench. Each of the bolts 18 is formed with a disk-like head 22, adapted to fit in a slot 23, formed in the upper part of the members 8, as will be clearly seen by reference to Figs. 2, 4, and 5 of the drawings. It will be further observed that a recess 24 is formed near the ends of the members 4 and 5 and also in a contiguous part of the members 8, said curved recess corresponding to the recess 25 in the inner edge of the saw-tooth 26, and designed to rest in said curved recess in all of said parts is the shaping-rod 27, which is eccentric in cross-section and is provided upon one end with the controlling-lever 28, having the hand-hold or member 29, whereby the said shaping-rod 27 may be easily turned to act upon the point of the tooth in a manner hereinafter set forth.

By reference to Fig. 4 it will be further observed that a shaping-anvil 30, designed to act upon the top or outer edge of the tooth is located in the anvil-seat 31, said anvil having a threaded extension or stem 32 disposed in a threaded seat in a contiguous part of the casing 1, the outer end of the threaded stem having an angular head 33 for wrench control. The anvil is held locked in an adjusted position by the jam-nut 34, as clearly shown by reference to Fig. 4. A cam 30ª is arranged under the anvil 30 and one end thereof projects from the casing 1 and is provided with a head 30ᵇ, whereby it may be readily rotated by means of a suitable wrench. This cam 30ª serves to support the anvil and prevent injury to its stem 32 when downward pressure is exerted thereupon. As a guide or index for the proper adjustment of my tooth-shaping instrument I have provided the member or cross-head 35, secured to the standard 36, the lower end 37 of which is designed to rest against the side of the saw, while the upper end is formed with a slot 38, designed to receive the clamping-bolt 39, carried by the arm 40, the latter being secured to the framework or body portion 1 in any preferred way.

It will be seen that the member 36 is arranged in pairs, whereby the lower extension 37 will be disposed so as to rest upon either side of the saw, and thus prevent the member 35 from casually slipping off of the teeth. After the controlling-levers 19 and 28 are properly adjusted they are respectively held against reverse movement by the crank-arms 41 and 42, said crank-arms being locked in position by suitable set-screws 43, it being understood that the inner ends of the crank arms or shafts 41 and 42 are loosely seated in suitable apertures in the framework 1.

In using my invention the saw is entered in the slot 2, so as to bring the concave seat 25 in the saw-tooth in engagement with the side of the shaping-rod 27 and with the members 4 and 5 resting upon either side of the saw-tooth. The shaping-anvil 36 is then forced inward against the outer edge of the saw-tooth by placing a wrench upon the angular head 33, and after proper pressure has been brought to bear upon the point of the tooth the shaping-rod is turned through the mediation of the controlling-lever 28, with the result that the tooth is spread laterally into the space provided by the beveled corners 7, thus leaving both sides of the tooth so as to extend laterally and, in effect, insure that the path cut by the teeth will leave a free clearance on both sides of the body portion of the saw and enable it to pass freely through the timber.

While I have described the preferred combination and construction of parts deemed necessary in materializing my invention, I desire to comprehend in this application all substantial equivalents and substitutes.

Having thus fully described my invention, what I claim as new, and desire to secure by Letters Patent, is—

1. In a device of the character described, the combination with the body thereof having a saw-receiving opening therein; of oppositely-disposed tooth-shaping members within the body, adjusting-screws mounted within the body and engaging and connected to the tooth-shaping members, and screw-threaded supports depending from the body, said shaping members being connected thereto so as to slide laterally and supported thereby.

2. In a device of the character described, the combination with a body having a saw-receiving opening therein; of clamping members within the body and at opposite sides of the opening, slotted ears extending from said members, adjusting devices secured to the body and engaging and supporting the ears, said ears being mounted upon the adjusting devices so as to slide laterally, means for independently adjusting the clamping members laterally, said members remaining parallel during their adjustment, and tooth-shaping members adjustably secured to the clamping members.

In testimony whereof I have signed my name to this specification in the presence of two subscribing witnesses.

WILLIAM BARKLA.

Witnesses:
    JEANIE JACOBS.
    THOMAS E. JACOBS.